United States Patent Office 3,454,485
Patented July 8, 1969

3,454,485
OXYGEN SENSOR WITH SCAVENGER MEANS
Peter Hauk, Pasadena, and Joe A. Porter, Whittier, Calif., assignors to Beckman Instruments, Inc., a corporation of California
Filed July 1, 1966, Ser. No. 562,273
Int. Cl. B01k 3/12, 3/00, 3/06
U.S. Cl. 204—195         2 Claims

ABSTRACT OF THE DISCLOSURE

An electrochemical cell for performing polarographic analysis in which a pair of electrodes are positioned in an electrolyte reservoir in the cell body with a selectively permeable membrane separating the electrodes and electrolyte from the sample. A unitary metallic structure is replaceably mounted in the reservoir. This structure serves to scavenge from the electrolyte a constituent dissolved therein which is the same as the constituent being analyzed that diffuses through the membrane into the cell. The scavenger improves the response, sensitivity and stability characteristics of the cell.

---

This invention relates generally to electrochemical cells and, more particularly, to electrochemical cells for measuring the oxygen content of a sample medium.

An electrochemical cell of the type to which the present invention pertains comprises a pair of electrodes bridged by an electrolyte and separated from the sample medium by means of a membrane that is permeable to the constituent of the sample being analyzed but impermeable to the electrolyte. Normally the membrane is stretched tightly over the sensing electrode of the cell so as to provide an electrolyte film space therebetween. A suitable polarizing potential is applied across the electrodes of the cell so that in the absence of the constituent in the sample that is being measured, the electrode system becomes polarized so that the current which normally flows between electrodes in the external current measuring circuit is reduced nearly to zero, after a short time. In the presence of the constituent in the sample that is to be measured, however, the electrodes become depolarized and current flows again. The magnitude of the current between the electrodes is a function of the concentration of the constituent in the sample medium.

A similar cell of the type to which the present invention pertains comprises a pair of dissimilar electrodes which are disposed as above except that no potential is applied to achieve polarization in the absence of the constituent in the sample. Here too, in the presence of the constituent in the sample that is to be measured, the electrodes become depolarized and the electrochemical potential between the two dissimilar electrodes causes current to flow between electrodes in the external current measuring circuit. While both of the aforementioned cells operate on the principle of polarography, the second mentioned cell is oftentimes referred to in the art as being a self-energized or a galvanic cell. Therefore, for purposes of distinguishing between the two types of cells in this description, the first mentioned cell will hereinafter be called a polarographic cell while the second mentioned cell will be called a galvanic cell.

Although cells of this kind have been in widespread use for several years for the measurement of oxygen and have given adequate performance, we have discovered that the response time, sensitivity and stability at low oxygen concentrations of such cells are adversely affected when the cells incorporate an electrolyte reservoir for replenishing electrolyte in the film space between the sensing electrode of the cell and the membrane. This results from the presence of dissolved oxygen in the electrolyte within the electrolyte reservoir of the cell which causes the same electrochemical reaction at the sensing electrode of the cell as the oxygen from the sample medium being analyzed. The dissolved oxygen in the electrolyte results from the fact that electrolyte in the cell is normally supplied thereto in an atmosphere of air, which contains 21% oxygen, thus resulting in the oxygen in the air becoming dissolved in the electrolyte.

It is, therefore, the principal object of the present invention to provide in an electrochemical cell means for removing a substance in the electrolyte of the cell which is the same as the constituent being measured in the sample medium.

Another object of the invention is to provide a electrochemical cell having improved response, sensitivity and stability characteristics.

According to the principal aspect of the present invention, there is provided an electrochemical cell for measuring a constituent in a sample, such as oxygen, in which the cell has a pair of spaced electrodes with a membrane permeable to the constituent being positioned over one of the electrodes to define an electrolyte film space therebetween. The cell is provided with a reservoir in communication with said film space for holding an electrolyte so that electrolyte in the film space may be replenished, thereby permitting use of the cell over an extended period of time. The novel feature of the invention is the provision in the electrolyte reservoir of means, hereinafter referred to as a scavenger, for removing a substance dissolved in the electrolyte from external surroundings which is the same as the constituent being measured in the sample medium. By the removal of such substance from the electrolyte in the reservoir of the cell, the cell has been found to have greatly improved response, stability and sensitivity to the constituent being measured.

Other objects, aspects and advantages will become apparent from the following description taken in connection with the following drawing wherein.

Figure 1:
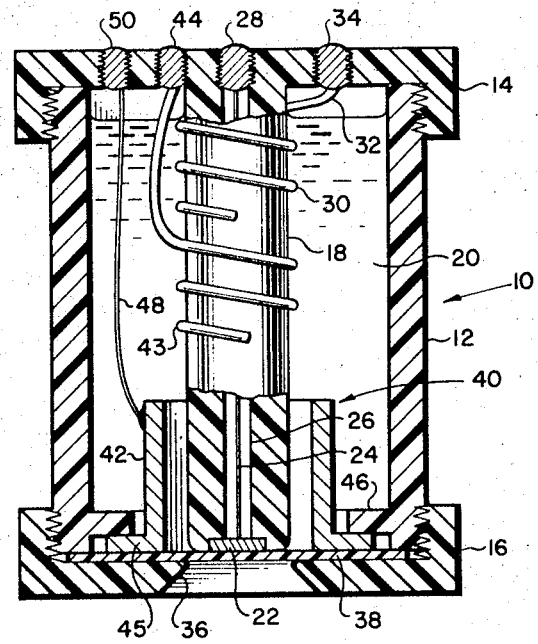
FIG. 1 is a longitudinal sectional view of a cell incorporating one form of the scavenger of the invention.

Referring now to the drawing in detail, there is illustrated in FIG. 1 a cell, generally designated by the numeral 10, comprising a cylindrical element 12 closed at its upper end by threaded cap 14 and at its lower end by a second threaded cap 16, such elements being formed of a nonconductive material, such as plastic. The cap 14 includes a cylindrical body 18 coaxially positioned in the cylindrical element 12 and spaced from the walls thereof so as to provide an electrolyte reservoir 20. The end of the body 18 terminates adjacent the cap 16 and has mounted therein an electrode disc 22 which is flush with the end of the body 18. A conductor 24 extending lengthwise through an axial passage 26 in the body 18 connects the electrode 22 to a terminal 28 in the cap 14. The second electrode 30 of the cell is in the form of a wire wrapped about the body 18 and has one end 32 connected to a terminal 34 in the cap 14.

The cap 16 has a central opening 36 therein aligned with the cathode 22. A membrane 38 which is permeable to oxygen and substantially impermeable to electrolyte, such as polyethylene or Teflon, is positioned between the cap 16 and the end wall of the cylindrical element 12 so that the membrane is tightly stretched over the end of the body 18 and cathode 22 to define therebetween an electrolyte film space which is in communication with the electrolyte reservoir 20.

When the cell 10 is used as a polarographic type cell for measuring oxygen, the cathode 22 may be formed of gold or other noble metal, the anode 30 may be formed of silver and the electrolyte is then suitably a potassium chloride solution. As well known in the art, a suitable voltage is impressed across the electrodes from an external circuit, not shown, so that when oxygen passes through the membrane 38 into the electrolyte film space adjacent to the cathode 22, the oxygen is reduced at the cathode thereby producing a current which is an indication of the oxygen content of the sample medium being analyzed.

When the cell 10 is used as a galvanic type cell for measuring oxygen, the cathode 22 may be formed of gold, silver or another noble metal, the anode 30 may be formed of zinc, cadmium, lead or another suitable base metal which has an electromotive potential relative to hydrogen of the proper magnitude, the electrolyte may be a potassium hydroxide solution. As well known in the art an external voltage is not required and when oxygen passes through the membrane 38 as described above, the oxygen is reduced at the cathode thereby producing a current which flows through the external circuit connected to terminals 28 and 34, and which is an indication of the oxygen content of the sample medium being analyzed.

As explained previously, when electrolyte is supplied to the reservoir 20 of the cell 10, oxygen in the atmosphere dissolves in the electrolyte so that in use of the cell the oxygen in the electrolyte passes to the electrolyte film space between the membrane 38 and cathode 22 thus causing an electrochemical reaction in the cell which is the same as that resulting from the oxygen passing through the membrane from the sample medium, thus interfering with the measurement of the oxygen in the sample medium.

In accordance with the present invention, there is provided an electrochemical or chemical scavenger in the cell to remove the oxygen from the electrolyte, such scavenger being generally designated by numeral 40. Such a scavenger may be one of three kinds: an electrochemical scavenger requiring the use of an external potential, a self-energized or galvanic electrochemical scavenger not requiring such an external potential or a chemical scavenger. Each of these several types of scavengers may be employed in either the polarographic or galvanic version of the oxygen measuring cell described above to effect the purpose of the invention.

The polarographic externally powered electrochemical scavenger 40, shown in FIG. 1 for use in the polarographic version of the electrochemical cell 10, comprises a pair of electrodes, the cathode being a metal tube 42 surrounding the body 18 of the cell and the anode being a wire 43 surrounding the body 18 but spaced from the electrode 30. The wire 43 is connected to a terminal 44 in the cap 14. The metal tube 42 has an outwardly extending annular flange 45 fixed between an inwardly extending flange 46 of the cylindrical element 12 and the cap 16 whereby the tube 42 is mounted in fixed position in the reservoir 20 in close proximity to the electrolyte film space between the cathode 22 and membrane 38. It is desirable that the electrode 42 be so positioned to ensure that substantially no oxygen in the electrolyte 20 reaches the electrolyte film space. The electrode 42 is connected by a conductor 48 to a terminal 50 in the cap 14.

The cathode 42 of the scavenger shown in FIG. 1 is preferably formed of gold or another noble metal and the anode 43 be formed of silver. By impressing a voltage of 0.6 to 0.8 volt across the terminals 44 and 50 of the scavenger electrode pair, oxygen dissolved in the electrolyte in the reservoir 20 is electrochemically reduced to water, thereby removing the free oxygen from the electrolyte which would otherwise interfere with the output of the measuring electrode pair 22 and 30 of the cell.

Figure 2:
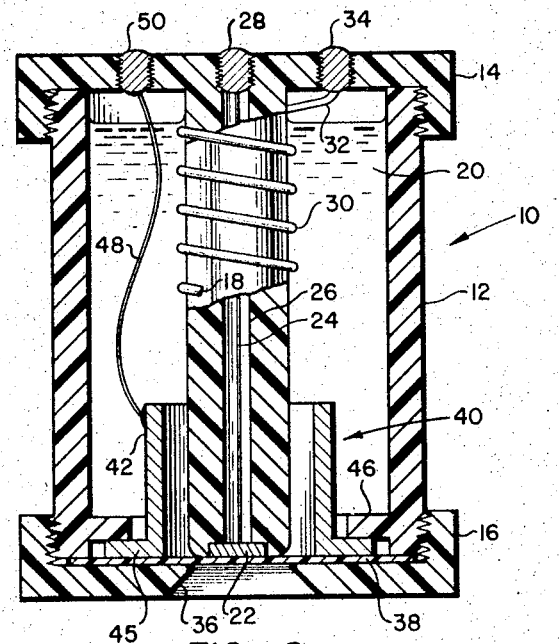
FIG. 2 is a longitudinal sectional view of a modified form of the cell in FIG. 1.

Although the scavenger 40 in FIG. 1 utilizes two anodes 30 and 43, it is understood that the silver wire 43 and terminal 44 could be eliminated and the silver wire 30 be a common anode to the polarographic electrode pair and to the scavenger electrode pair as illustrated in FIG. 2. In such embodiment of the invention, the appropriate voltage for the scavenger electrode pair would be applied across such terminals 34 and 50 to remove the oxygen from the electrolyte in reservoir 20.

Figure 3:
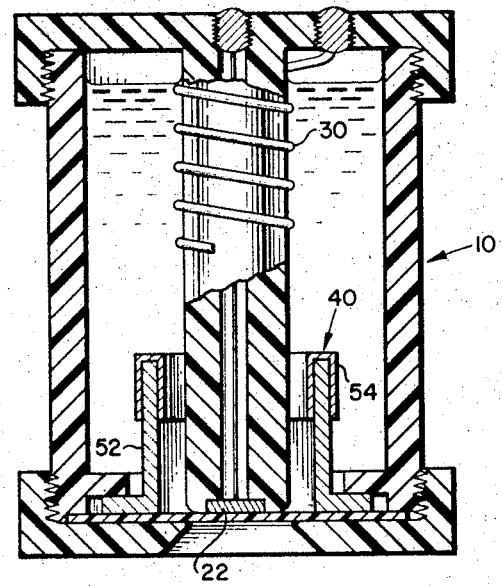
FIG. 3 is a longitudinal sectional view of a cell incorporating a modified form of the scavenger of the invention.

Referring now to FIG. 3 of the drawing, there is shown the self-energized or galvanic form of the scavenger 40 of the invention for use in the polarographic oxygen cell, the remainder of the cell 10 being identical to that illustrated in FIG. 2. In this embodiment, the scavenger 40 does not require an external power source. It has been found that a suitable galvanic scavenger system is one having an anode formed of either zinc, cadmium or lead and a cathode formed of gold, silver or other noble metal with the electrodes being short circuited. As seen in FIG. 3, the electrodes of the scavenger 40 comprise a gold, silver or other noble metal tube 52 having the same configuration as tube 42 in FIGS. 1 and 2 except that its upper portion is covered with a coating 54 of either zinc, cadmium or lead whereby the electrodes 52 and 54 of the scavenger are short circuited. By a choice of these electrode materials, the scavenger 40 in FIG. 3 removes free oxygen from the electrolyte by forming an insoluble oxide of the anode metal, but without the requirement of the application of an external power source to the electrodes.

Figure 4:
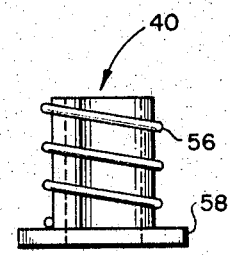
FIG. 4 is an elevational view of another form of the scavenger of the invention.

A modified form of a galvanic scavenger is illustrated in FIG. 4. In this embodiment, the scavenger comprises a wire 56 of lead, zinc or cadmium wound about and soldered to a metal tube 58 of the same configuration as tube 42 in FIG. 1, but formed of either gold, silver or other noble metal. While the electrode pairs 52, 54 and 56, 58 in FIGS. 3 and 4, respectively, are shown to be in intimate contact to short circuit the same, it is understood that such electrodes could be spaced from one another in the reservoir 20 and short circuited by being connected by a wire either inside the cell 10 or extending outside thereof. However, obviously the form of the scavenger in FIGS. 3 and 4 provide a simpler and more compact construction which is more easily mounted into the cell 10.

The externally powered electrochemical scavenger for use in the galvanic version of the oxygen measuring cell is the same as that shown in FIG. 1 except that no external potential is applied to terminals 28 and 34. In this embodiment, the scavenger cathode 42 may be gold or another noble metal, the scavenger anode 43 may be silver or another suitable metal and the electrolyte may be an alkaline solution such as a potassium hydroxide solution.

The galvanic electrochemical scavengers for use in the galvanic version of the oxygen measuring cell are exactly the same as the several galvanic scavengers described in connection with FIGS. 3 and 4 for use in the polarographic version of the oxygen measuring cell except that it is also suitable in this application to employ one common anode. This is best illustrated by referring again to FIG. 2 in which now the cell cathode 22 and scavenger cathode 42 may be gold or another noble metal, the common anode 30 may be formed of lead, zinc, cadmium or other suitable metal, the electrolyte may be an alkaline solution such as a potassium hydroxide solution, and the terminals 50 and 34 are connected externally, or a conductor (not shown) may connect the scavenger cathode 42 to the cell anode 30 or to the cell anode terminal 34. The essence of this modification is that the scavenger cathode 42 and the common anode 30 are electrically connected together, in whatever convenient fashion this may be achieved.

The chemical scavenger for use in either the polarographic or galvanic versions of the oxygen measuring cell effects the elimination of dissolved oxygen in the electrolyte in the electrolyte reservoir by direct chemical reaction. It is important in this connection however that neither the chemical scavenger itself nor undesirable reaction products interfere with the proper operation of the oxygen measuring cell. While a variety of materials are suitable as chemical scavengers, active metals such as alloys of magnesium, tallium, cadmium or zinc are particularly suitable because of their convenience.

Referring again to FIG. 2, one form of a chemical scavenger 40 would consist simply of the tube 42 constructed of an active metal such as those suggested above. The connector 48 and terminal 50 would be eliminated. Another convenient form for the chemical scavenger, not shown, would consist of a wire coil or cylinder of the above-mentioned materials disposed about the lower end of the body 18.

While the electrode materials for the scavenger 40 disclosed herein are preferred, inasmuch as they do not produce chemical reactions which adversely affect the polarographic measurement of oxygen at the cathode 22 and do not provide undesired quantities of sediment in the reservoir 20, it is understood that other electrode materials may be utilized but with a sacrifice in the performance of the cell.

The advantages of the invention may be best appreciated by making reference to table below in which there is presented a comparison of the characteristics of three types of cells, the first cell being a conventional polarographic oxygen cell, not incorporating an oxygen scavenger, the second cell being a polarographic oxygen cell incorporating a gold-silver scavenger as shown in FIG. 2, except that the gold cathode of the scavenger was provided in the form of a gold wire coil rather than a cylinder, and with 0.7 volt being applied to the electrodes, and the third cell being a polarographic oxygen cell incorporating a silver-lead galvanic scavenger as shown in FIG. 3.

TABLE

| Item | Cell without scavenger | Cell with Au-Ag powered scavenger | Cell with Ag-Pb galvanic scavenger |
| --- | --- | --- | --- |
| Test 1 | 15 minutes | 74 seconds | 39 seconds. |
| Test 2 | 2 minutes | 18 seconds | 7.5 seconds. |
| Sensitivity | 0.6% $O_2$ | .005% $O_2$ | .001% $O_2$. |

In Test 1 referred to in table the current output of each cell was measured continuously with the cell initially being in air, which contains 21% oxygen, and then being disposed in an atmosphere of nitrogen gas, that is, an atmosphere containing no oxygen. In the case of the cell incorporating the gold-silver powered scavenger, the scavenger was operated for 20 hours prior to the test. In the case of the cell incorporating the silver-lead galvanic scavenger, the scavenger was in operation 24 hours prior to the test. The figures under each of the cells in table for Test 1 indicate the time required for the output signal of each of the cells to drop from 100% to 5% of full scale reading of the current indicating apparatus associated with the cells, the full scale reading of such apparatus being equivalent to 21% oxygen. In Test 2 referred to in table, each of the three cells was returned from the nitrogen atmosphere to an atmosphere of air, the figures under each cell in table for Test 2 indicating the time for the output signal of each cell to reach 95% of full scale reading. As can be seen from the figures in table, the cells of the invention incorporating scavengers for oxygen in the electrolyte have a response time to changes in the concentration of oxygen many times faster than that of the cell not incorporating a scavenger. Also, as seen by the figures in the last line of table, the cells of the invention are sensitive to much lower levels of oxygen than the conventional cell. Although the response time and sensitivity of the cell incorporating the gold-silver powered scavenger, as indicated in table, is not as favorable as that provided by the cell incorporating the silver-lead galvanic scavenger, it is believed that the former cell would have as good response and sensitivity as the latter mentioned cell if a gold cylinder were employed at the cathode of the scavenger rather than a gold wire coil.

From the present invention, it can be readily appreciated that greatly improved results are provided by removing oxygen from the electrolyte in the reservoir 20 by means of the chemical or electrochemical scavenger 40, thus rendering an improved polarographic oxygen cell highly suitable for use in many applications for which the conventional was not previously employed, particularly for the accurate, stable measurement of low concentrations of oxygen.

Although several embodiments of the invention have been disclosed herein for purposes of illustration, it will be understood that various changes can be made in the form, details, arrangement, proportions and materials of the various parts in such embodiments without departing from the spirit and scope of the invention as defined by the appended claims.

What is claimed is:
1. An electrochemical cell for measuring a constituent in a sample comprising:
   a nonconductive body having a reservoir opening at one end thereof, said reservoir being adapted to hold an electrolyte which may contain a substance the same as said constituent;
   a pair of spaced electrodes in said reservoir;
   a membrane permeable to said constituent and impermeable to the electrolyte mounted at said one end of said body so as to separate said electrodes and electrolyte in the reservoir from the sample, said membrane being positioned over one of said electrodes to define an electrolyte film space therebetween in communication with said reservoir;
   a unitary metallic structure other than said electrodes positioned in said reservoir adjacent to but outside of said electrolyte film space, said structure having the characteristic of removing said substance from electrolyte in the reservoir without the application of an external electromotive force thereto;
   cap means threadedly engaged to said one end of said body, said cap means cooperating with said body to mount said membrane thereon and to mount said unitary structure in said reservoir; and
   said unitary structure being slidably removable from said reservoir through said one end of said body and said membrane being removable from said body by the single step of disengaging said cap means from said body.

2. An electrochemical cell as set forth in claim 1 wherein said unitary structure comprises two dissimilar metals in intimate contact, said metals being capable of electrochemically removing said substance from said electrolyte.

References Cited
UNITED STATES PATENTS

| | | | |
| --- | --- | --- | --- |
| 3,071,530 | 1/1963 | Neville | 204—195 |
| 3,272,725 | 9/1966 | Garst | 204—1.1 |
| 3,328,277 | 6/1967 | Solomons et al. | 204—195 |
| 3,334,039 | 8/1967 | Vlasak | 204—195 |

JOHN H. MACK, *Primary Examiner.*

T. TUNG, *Assistant Examiner.*

U.S. Cl. X.R.

204—232, 248